US006944384B2

(12) United States Patent
Loncar et al.

(10) Patent No.: US 6,944,384 B2
(45) Date of Patent: Sep. 13, 2005

(54) METHODS FOR CONTROLLING POSITIONS OF THE GUIDED MODES OF THE PHOTONIC CRYSTAL WAVEGUIDES

(75) Inventors: Marko Loncar, Pasadena, CA (US); Jelena Vuckovic, Pasadena, CA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 192 days.

(21) Appl. No.: 10/044,017

(22) Filed: Jan. 10, 2002

(65) Prior Publication Data

US 2002/0150366 A1 Oct. 17, 2002

Related U.S. Application Data

(60) Provisional application No. 60/261,291, filed on Jan. 12, 2001.

(51) Int. Cl.[7] .................................................. G02B 6/10
(52) U.S. Cl. ........................ 385/129; 385/130; 385/131; 385/132
(58) Field of Search ................................. 385/129–132

(56) References Cited

U.S. PATENT DOCUMENTS

| 6,101,300 A | 8/2000 | Fan et al. |
| 6,134,369 A | 10/2000 | Kurosawa |
| 2002/0048422 A1 | 4/2002 | Cotteverte et al. |

Primary Examiner—Rodney Bovernick
Assistant Examiner—Sung Pak
(74) Attorney, Agent, or Firm—Daniel L. Dawes; Myers Dawes Andras & Sherman LLP (57) ABSTRACT

The invention is directed to different methods for controlling the positions of the guided modes of the photonic crystal waveguides. Methods based on both rearrangement of the holes and changing the size of the holes are presented. We have observed and explained the appearance of acceptor-type modes and the donor-type waveguides. The ability to tune frequencies of the guided modes within a frequency bandgap is necessary in order to achieve efficient guiding of light within a waveguide (reduced lateral and vertical waveguide losses) as well as to match frequencies of eigen modes of different photonic crystal based devices in order to have good coupling between them.

20 Claims, 10 Drawing Sheets

| 0 | 0.1 | 0.2 | 0.3 | 0.4 | 0.5 | 0.6 | 0.7 | 0.8 | 0.9 | 10 |

METHODS FOR CONTROLLING POSITIONS OF THE GUIDED MODES OF THE PHOTONIC CRYSTAL WAVEGUIDES

This application claims the benefit of Provisional Application No. 60/261,291, filed Jan. 12, 2001.

BACKGROUND OF THE INVENTION

1. Field of the Invention

The invention relates to the field of waveguides in photonic crystals and in particular to different methods for controlling the positions of the guided modes of the photonic crystal waveguides.

2. Description of the Prior Art

The tasks of generation, guiding and detection of the lightwave signals are fundamental tasks in any optical system. Ideally, in order to make small scale, all optical signal processing devices, it is necessary to have the components that are doing each of these tasks integrated on one chip. Photonic crystals introduced in the recent years, are thought to be promising candidates for achieving this high level of integration. Due to the difficulties associated with the fabrication of three dimensional photonic crystals, planar photonic crystals have attracted significant research attention.

The basis of the planar photonic crystal is a dielectric slab, perforated with a two dimensional periodic lattice of holes. The symmetry of the lattice (triangular, square, etc.) plays a crucial role and determines the properties of the planar photonic crystal. Due to the periodicity of the lattice, frequency bandgaps for guided modes of the slab are opened, and light of certain frequencies can not propagate in the slab. The light is localized to the slab in the vertical direction by means of total internal reflection (TIR) and is controlled in the lateral direction by the two dimensional photonic crystal. The combination of these two mechanisms makes localization of light in all three dimensions possible.

Photonic crystal waveguides have attracted attention since they were first proposed. The most interesting property of the photonic crystal waveguide is the possibility of making sharp bends, with acceptable transmission efficiency around the bend. So far, many groups have investigated different properties of the photonic crystal waveguides. In most of these studies, waveguides were defined as single-or multi-line defects in the photonic crystal lattice formed by removing one or more rows of holes. Modal analysis of this type of waveguide show that they are multimode. Recently, a novel way of reducing the number of modes in the waveguide has been proposed and analyzed in two dimension. Experimental characterization of guiding in photonic crystal waveguides was also reported by several groups.

What is needed is the ability to control the position of the guided modes within a frequency bandgap of surrounding planar photonic crystal in order to achieve three important goals: efficient guiding of light, efficient coupling of the light from an external light source into the waveguide and efficient coupling of different photonic crystal devices.

BRIEF SUMMARY OF THE INVENTION

The invention is directed to different methods for controlling the positions of the guided modes of the photonic crystal waveguides. Methods based on both rearrangement of the holes and changing the size of the holes are presented. We have observed and explained the appearance of acceptor-type modes and the donor-type waveguides. The ability to tune frequencies of the guided modes within a frequency bandgap is necessary in order to achieve efficient guiding of light within a waveguide (reduced lateral and vertical waveguide losses) as well as to match frequencies of eigen modes of different photonic crystal based devices in order to have good coupling between them.

The invention is directed to different waveguide designs, based on a triangular planar photonic crystal lattice, and their properties as disclosed by analyzing $\omega$-$\beta$ dispersion relations. We will show several ways of controlling the frequencies of guided modes, feature that can also lead to the single-mode regime of operation of the waveguide. The ability to control the position of the guided modes within a frequency bandgap of surrounding planar photonic crystal is necessary in order to achieve three important goals: efficient guiding of light (reduced lateral and vertical losses), efficient coupling of the light from an external light source into the waveguide (no leaky modes at the frequency of interest) and efficient coupling of different photonic crystal devices (for example, frequency matching of eigen modes of the cavity and waveguide sections coupled to the cavity). All the structures presented in this work have been fabricated in silicon. Details on fabrication procedure are presented in our previous work at Loncar et.al., "Design and Fabrication of Silicon Photonic Crystal Optical Waveguides," Journal of Lightwave Technology, vol. 18, no. 10, pp. 1402–11, October 2000.

The invention is defined as a photonic crystal waveguide for coupling with optic devices comprising a planar photonic crystal slab in which an array of holes is defined, and a waveguide defined by a line defect defined in the slab. The line defect is created by a geometric perturbation of at least a first set of holes with respect to a second set of holes to create at least one guided mode of light propagation in the waveguide, which exhibits reduced vertical and lateral losses. Increased coupling of light into the slab and closer matching of frequencies of eigen modes of the optic devices coupled to the waveguide are realized. The light is guided in the waveguide solely due to photonic bandgap (PBG) effect.

In one embodiment the geometric perturbation is a positional displacement of the first set of holes with respect to the second set of holes in a predetermined direction. The first and second set of holes have the same diameter of hole therein. In one embodiment the predetermined direction is the $\Gamma X$ direction in the slab, the vector direction to the next nearest neighbor in the lattice of holes. The waveguide is defined as a type 1 waveguide. In another embodiment the predetermined direction is the $\Gamma J$ direction in the slab, the vector direction to the nearest neighbor in the lattice of holes . . . . The waveguide is defined as a type 2 waveguide. The positional displacement, d, is a fraction, I, of the lattice spacing, a, of the array, namely $d=I \cdot a$, where $0<I<1$. In one illustrated embodiment, $d=0.5a$.

The photonic crystal has a bandgap and d is increased until both acceptor-type modes and donor-type modes are positioned in the bandgap of the waveguide. More particularly, the slab has a bandgap, an air band and a dielectric band for propagation of modes and where the geometric perturbation is created by displacement of holes into positions within the array of holes where dielectric is normally present to pull modes from the dielectric band into the bandgap.

In another embodiment the geometric perturbation is created by displacement of dielectric into positions within the array of holes where air is normally present to pull modes from the air band into the bandgap.

In still another embodiment the geometric perturbation is created by increasing or decreasing the diameter of a first set of holes in the array of holes relative to a second set of holes comprising a remainder of holes of the array. The first set of holes is adjacent at least in part to the line defect. The waveguide is defined as a type-3 waveguide.

In one embodiment, the slab has a bandgap and an air band and the second set of holes has a radius, r=0.3a and the first set of holes has a radius, $r_{defect}$=0.2a. The array of holes has a triangular lattice so that only air band modes are pulled down in the bandgap and no acceptor-type modes are present. In another embodiment the second set of holes has a radius, r=0.3a and the first set of holes has a radius, $r_{defect}$=0.45a so that only acceptor-type modes are present.

The invention is also defined as a method for defining a photonic crystal waveguide for coupling with optic devices comprising the steps of defining an array of holes in a planar photonic crystal slab, and creating a line defect in the slab to define the waveguide. The line defect is created by a geometric perturbation of at least a first set of holes with respect to a second set of holes to create at least one guided mode of light propagation in the waveguide which exhibits reduced vertical and lateral losses. Increased coupling of light into the slab and closer matching of frequencies of eigen modes of the optic devices coupled to the waveguide are achieved.

The step of creating the line defect comprises forming the first set of holes displaced in a predetermined direction with respect to the second set of holes. The first and second set of holes have the same diameter of hole therein.

The step of forming the first set of holes displaces the holes in the ΓX direction in the slab the waveguide being defined as a type 1 waveguide. In another embodiment the step of forming the first set of holes displaces the holes in the ΓJ direction in the slab. The wave guide being defined as a type 2 waveguide.

The step of forming the first set of holes displaces the holes by a displacement, d, which is a fraction, I, of lattice spacing, a, of the array, namely d=I*a, where 0<I<1. In an illustrated embodiment the step of forming the first set of holes displaces the holes by a displacement, d=0.5 a.

More generally, the waveguide has a bandgap and the step of forming the first set of holes displaces the holes by a d which is reduced until both acceptor-type modes and donor-type modes are positioned in the bandgap of the waveguide.

The slab has a bandgap, an air band and a dielectric band for propagation of modes and the step of creating the line defect comprises forming the first set of holes displaced by displacement of holes into positions within the array of holes where dielectric is normally present to pull modes from the dielectric band into the bandgap. In still another embodiment the step of creating the line defect comprises forming the first set of holes displaced by displacement of holes into positions within the array of holes where air is normally present to pull modes from the air band into the bandgap.

In one embodiment the step of creating the line defect comprises increasing or decreasing the diameter of a first set of holes in the array of holes relative to a second set of holes comprising a remainder of holes of the array. The first set of holes is adjacent at least in part to the line defect. The waveguide defined as a type-3 waveguide.

In one embodiment the step of creating the line defect comprises decreasing the diameter of a first set of holes to a radius, $r_{defect}$=0.2a and the second set of holes has a radius, r=0.3a. The first set of holes has the array of holes has a triangular lattice so that only air band modes are pulled down in the bandgap and no acceptor-type modes are present.

In another embodiment the step of creating the line defect comprises increasing the diameter of a first set of holes to a radius $r_{defect}$=0.45a, where second set of holes has a radius, r=0.3a so that only acceptor-type modes are present.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Method of Analysis

Figure 1:
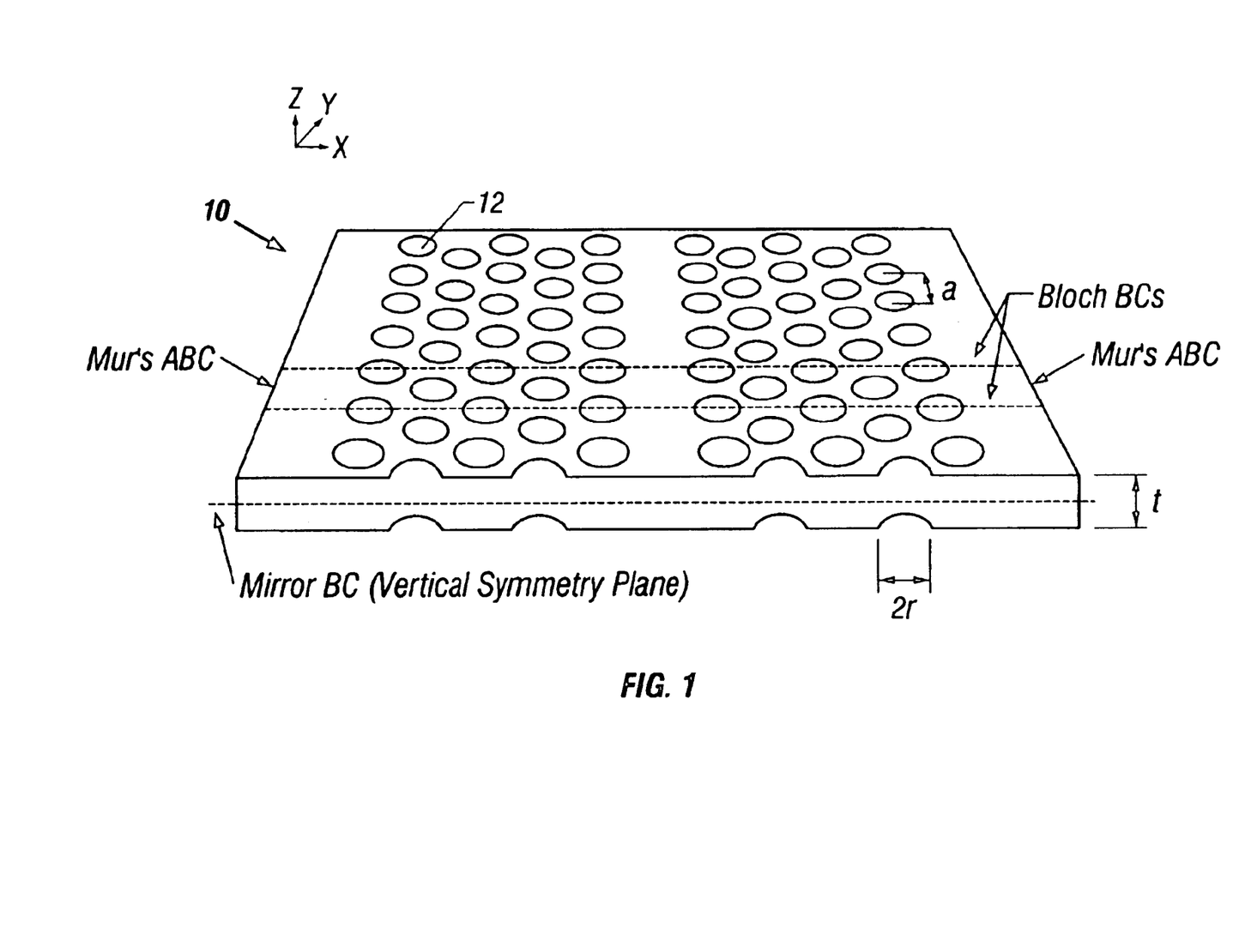
FIG. 1 is a cross-sectional perspective view of one embodiment of a waveguide in a photonic crystal in which all holes have the same diameter.

The waveguides described here were analyzed using the finite difference time domain (FDTD) code. We have analyzed Si slabs 10 (refractive index assumed to be nsi=3.5) of thickness t=0.55a, surrounded by air on both sides, and perforated with two dimensional triangular lattice of holes 12 of radius r=0.3a as shown in the perspective, crosssectioned view of FIG. 1. FIG. 1 shows a single line defect waveguide. The unit cell and boundary conditions used in the analysis for FDTD calculations are indicated. Parameter a is the periodicity of the lattice. The discretization of the space used in three dimensional FDTD code was a=20 computational points. In all analysis that follows we have analyzed only one half of the structure in the vertical direction, with a horizontal mirror boundary condition (boundary condition) applied at the middle of the slab. In that way we could select between vertically even (TE-like) and vertically odd (TM-like) modes. As it has been shown before, in this structure a bandgap exists only for TE-like guided modes. Another motivation for using the mirror boundary condition in the middle of the slab was a substantial reduction of time required to perform the calculations. In the vertical direction we have applied Mur's absorbing boundary conditions (ABCs) at a distance of $4a$ points (more than one wavelength in air) from the surface of the slab. In the y direction (along the waveguide) we have applied Bloch boundary conditions and in that way we could control the propagation constant of the mode ($\beta$). In the x direction we have applied Mur's ABC after eight layers of photonic crystal at both sides of the waveguide. The FDTD method used to find the dispersion relations, is as follows: we use some initial field distribution in the waveguide (Gaussian in our case) and then evolve the field in time using the boundary conditions described above. We store the field components in several low-symmetry points in the waveguide. Then, we find the spectrum of the time evolution. The peaks in the spectrum correspond to the eigen modes of the structure. In order to obtain the dispersion diagram, we plot the dependence of the frequency of the eigen modes versus the propagation constant. In this work we will be concerned mostly with TE-like modes although TM-like modes can also be guided due to the effective refractive index contrast between the line of missing holes and the perforated slab.

The first step in analysis of any photonic crystal based device is calculation of the band diagram. We used a similar method to the one described above to analyze a unit cell of triangular lattice by applying appropriate boundary conditions: Bloch's boundary conditions at all four sides of the cell in lateral direction, mirror boundary condition at the middle of the Si slab and the Mur's ABC after 4a points from the top surface of the slab. As it was mentioned above, the geometry used was r/a=0.3. In previous work we used the value r/a=0.4. The smaller value of r results in narrower bandgap, but in turn improves localization of light within a slab which is especially important for efficient turning of corners. Also, the structure with smaller holes is mechanically more stable (in the case of dielectric membrane suspended in air).

Figure 2:
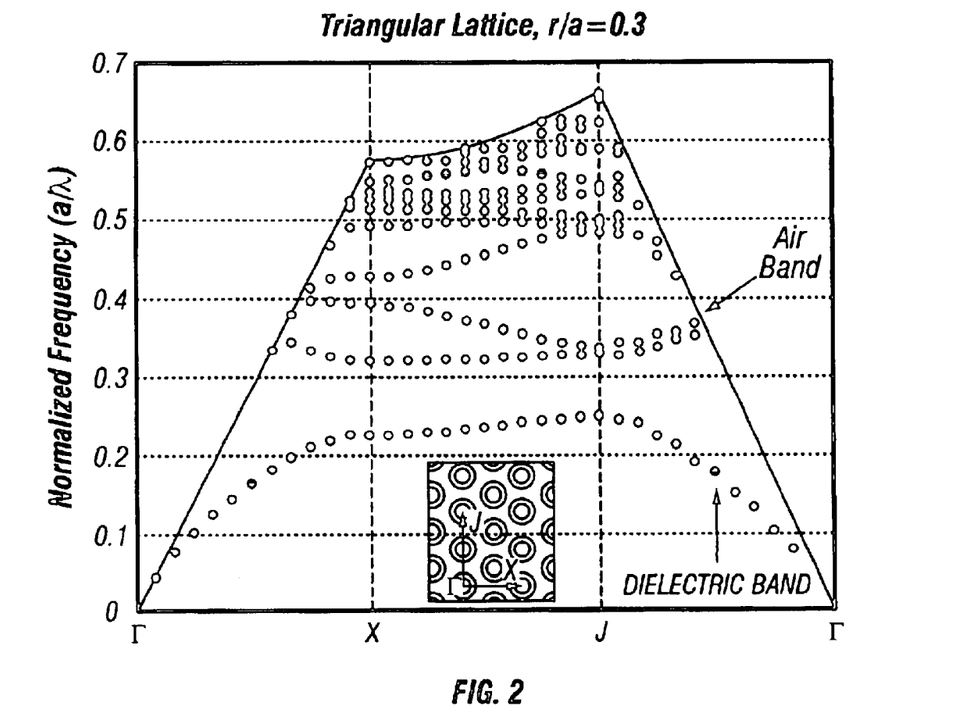
FIG. 2 is a dispersion diagram of a triangular lattice of FIG. 1 with r/a=0.3, where r is the radius of the holes and a the lattice spacing.

FIG. 2 shows the band diagram for the guided modes of the Si slab perforated with the two dimensional lattice of holes for r/a=0.3. The bandgap for the guided modes of the perforated dielectric slab is open around $a/\lambda_0=\omega a/2\pi c \approx 0.28$ normalized frequency. The dispersion diagram of FIG. 2 if or TE-like modes (vertically even). The parameters used were r=0.3a, t=0.55a for slab thickness, t, and $n_{si}$=3.5 for Si.

Single Line Defect Waveguide

By omitting one row of holes 12 we can form a simplest waveguide (type 0), shown in the FIG. 1. The localization of the light within the line defect can be explained in the following way; by omitting one row of holes 12 we are adding more high refractive index material and therefore frequencies of some modes from the air band are reduced and they are pulled down into the bandgap, to form localized defect states. This type of waveguides, where we increase the amount of the high dielectric material comparing to the unperturbed planar photonic crystal, will be called a donor-type waveguide. Propagation of light in the lateral direction is suspended since the defect mode of the waveguide is within the frequency bandgap of the planar photonic crystal, and in the vertical direction, due to the refractive index contrast of Si slab 10 and surrounding air (total internal reflection).

Figure 3A:
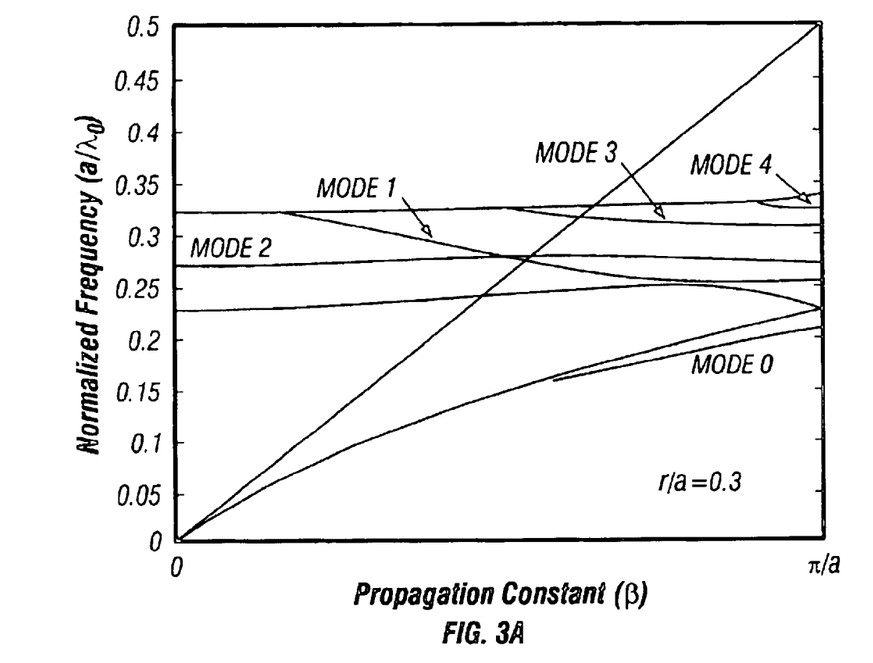
FIGS. 3a and 3b are dispersion diagrams for a single line defect waveguide, with FIG. 3a having r/a=0.3 and FIG. 3b having r/a=0.4.

FIG. 3(a) shows the dispersion diagram for guided modes of a single line defect waveguide. The $\omega$-$\beta$ relation for the guided modes in the single line defect waveguide type 0 for r/a=0.3 in FIG. 3a and r/a=0.4 in FIG. 3b. The straight solid line represents the light line. Modes above the light line in the light gray area, will leak energy into the air (leaky modes). Dark gray areas are the regions where extended states of the planar photonic crystal slab exist. Guiding can occur in the white regions, only. The crossing of the mode 1 and mode 2 in the FIGS. 3a and b is due to the different symmetry properties of these two modes in the lateral direction (mode 1 is odd and mode 2 even with respect to the mirror plane in the center of the waveguide). The modes-above the light line will leak energy into the air (leaky modes). In this work we are interested only in truly photonic band-gap (PBG) guided modes of the waveguide. Therefore, from now on (FIGS. 5, 7 and 8) we will show only modes that are located in the frequency bandgap. In addition, modes 3 and 4 are not of any practical interest, since they are located very close to the band edge and therefore will have significant lateral losses. Because of that they will not be included in the analysis that follows. In this disclosure we will be interested in the position of the modes 1 and 2, and any other additional modes that appear as we make some changes to the single line defect waveguide.

Figure 3B:
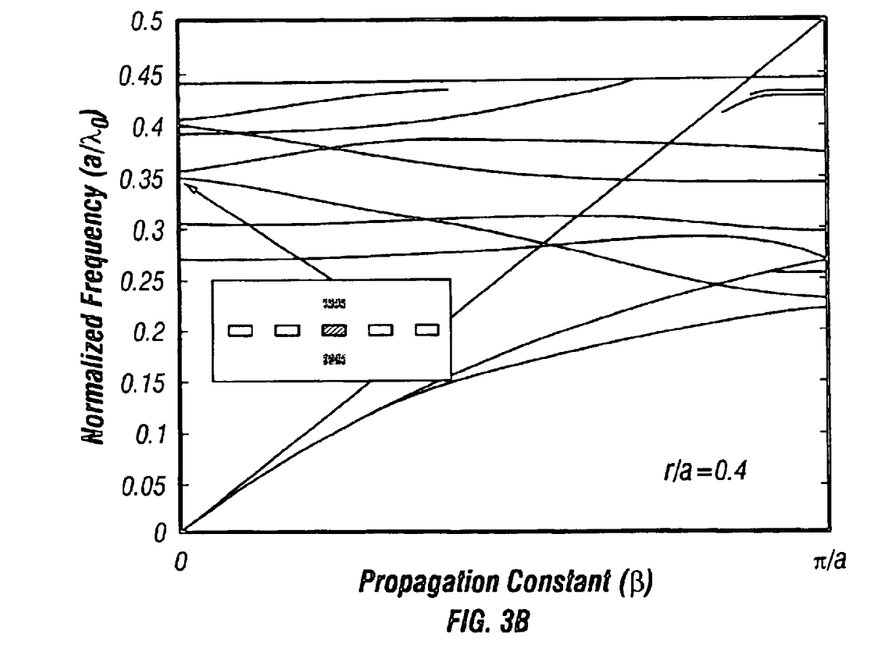

For comparison, in the FIG. 3(b) we have shown the dispersion diagram for guided modes in a single line defect waveguide with r/a=0,4, where all other parameters are held the same as in FIG. 3(a). It is clear that the structure with larger holes 12 has a much more complicated dispersion diagram. The, most important difference between the two structures is that in the case of bigger holes 12 there exist leaky modes at all bandgap frequencies. Therefore, by coupling light from an external light source into the waveguide, leaky modes are excited as well, and the coupling efficiency decreases. This can explain vertical losses that has been observed. However, in the structure with r/a=0.3 there are no leaky modes in the frequency range where mode 1 becomes guided [FIG. 3(a)]. Therefore, it can be used for guiding of light and efficient coupling from an external light source. However, the mode 1 is going to be lossy since it is close to the dielectric band edge, and therefore can leak energy into the planar photonic crystal by coupling to the extended states of the planar photonic crystal. In order to achieve efficient guiding of light, it is possible to push the mode 1 to higher frequencies, closer to the midgap, and use it as our guided mode of preference. This can be achieved by reducing the amount of high dielectric material that forms the waveguide.

Before analyzing different methods of controlling the positions of the guided modes, it is important to notice that all (PBG) guided modes in the FIGS. 3a and 3b (below the light line, and in the frequency bandgap) have almost flat dispersion relation and are localized in the very narrow frequency range. Therefore, these modes will have small group velocities and will be able to guide the light only in a very narrow frequency range. This is very different from an ideal case, where we want to have efficient transport of energy in a wide frequency range. Also, coupling between photonic crystal waveguides and plain ridge waveguides is expected to be poor due to very different dispersion characteristics of the two waveguides, and alternative methods of adiabatic coupling need to be used.

Different Methods For Controlling Positions Of The Guided Modes

A. Methods Based on Rearrangements of Planar Photonic Crystal Lattice

Figure 4A:
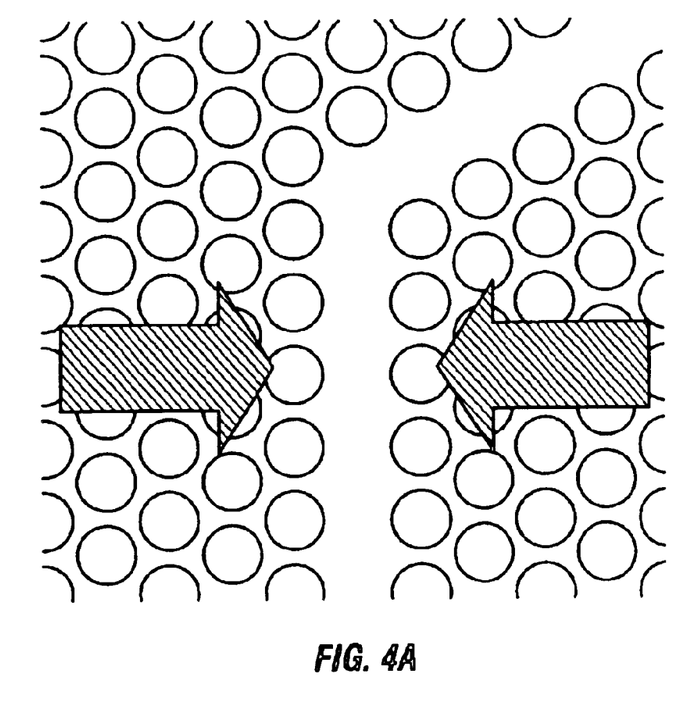
FIGS. 4a and 4b diagrammatically illustrate a first direction, ΓX, of displacement of the hole formation to narrow a bent waveguide.
Figure 4B:
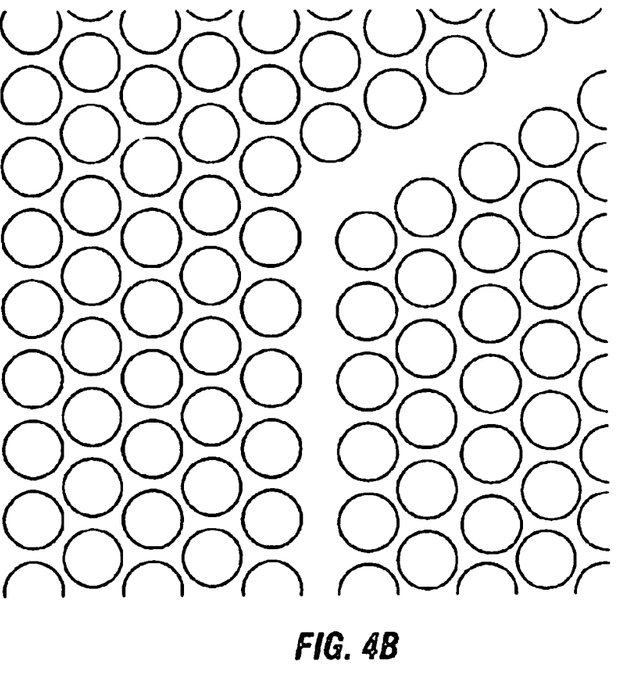
Figure 4C:
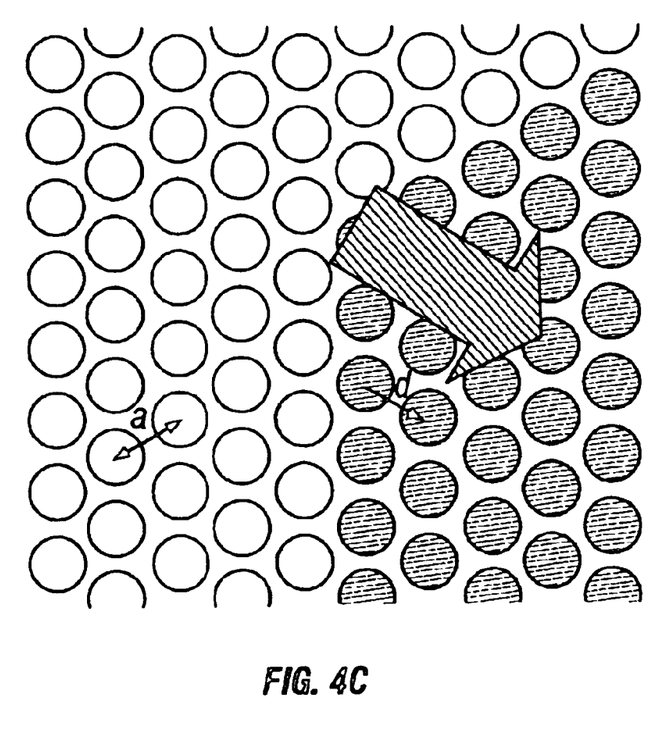
FIGS. 4c and 4d diagrammatically illustrate a second direction, ΓJ, of displacement of the hole formation to narrow a bent waveguide.
Figure 4D:
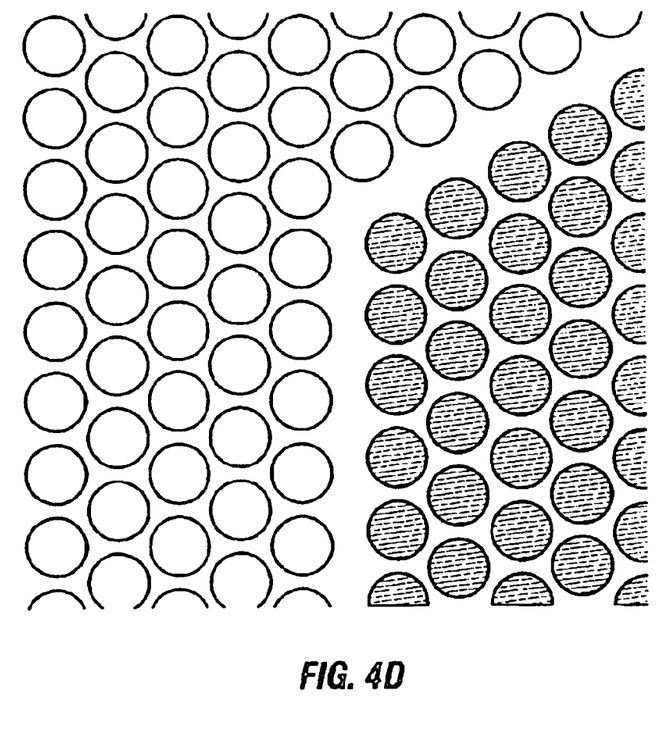

The straightforward way of controlling frequencies of the guided modes is reduction of the waveguide width. This can be achieved by moving the two semi-infinite planar photonic crystal mirrors that surrounds the single line defect, towards one another as diagrammatically depicted in FIGS. 4(a), and 4(b), along ΓX direction, defined as the direction to the next nearest neighbor in the lattice. FIG. 4a shows a bent waveguide being narrowed to the configuration of FIG. 4b. FIG. 4c shows a photonic crystal being opened up to create the bent waveguide of FIG. 4d. Different types of waveguides are obtained as shown in FIGS. 4a–4d. By moving planar photonic crystal mirrors that surrounds single line defect waveguide along the direction indicated by arrows (ΓX direction) in FIG. 4a we can form type 1 waveguide as shown in FIG. 4(b). FIG. 4(c) shows an unperturbed planar photonic crystal lattice. If we offset the black holes along the ΓJ direction (as indicated by arrow and defined as the direction to the nearest neighbor in the lattice) for amount d, we can form a new type of waveguide (type 2) as shown in FIG. 4d, which is narrower than a single line defect. By controlling the parameter d we can control the positions of the guided modes of the structure.

Figure 5A:
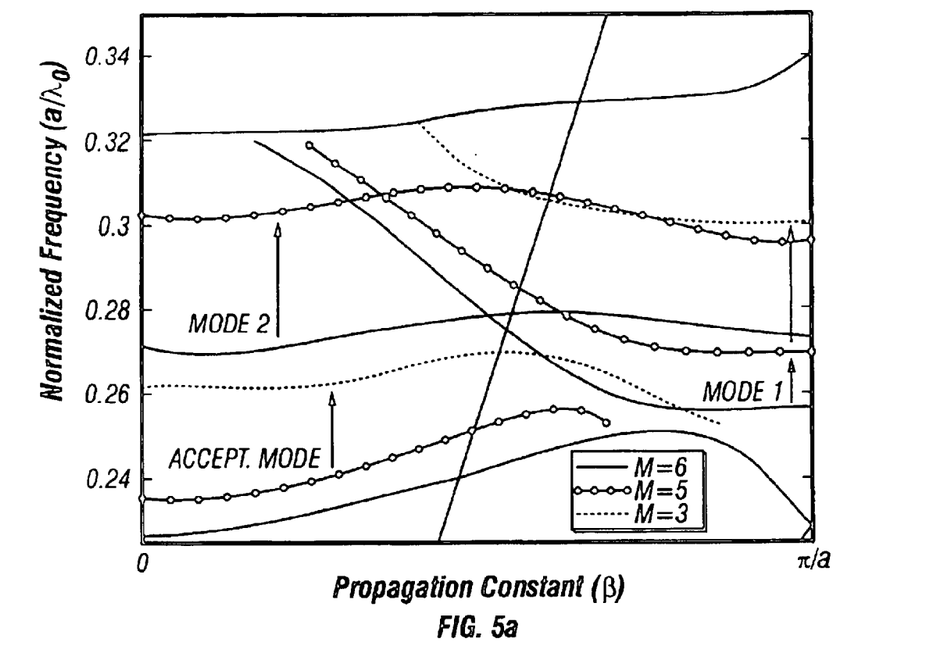
FIG. 5a is a dispersion diagrams for the waveguides of FIGS. 4a and 4b.
Figure 5B:
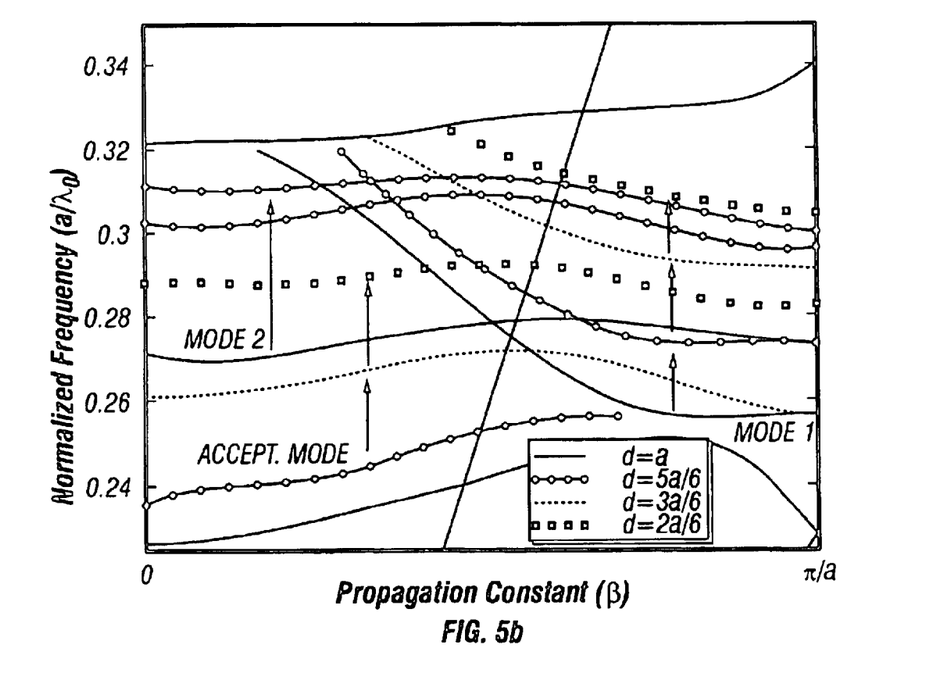
FIG. 5b is a dispersion diagrams for the waveguides of FIGS. 4c and 4d.

We will call this type of waveguide type 1. We have performed full three dimensional FDTD analysis of the structure. The dispersion diagram of the guided modes in waveguides of different widths is shown in the FIG. 5(a). FIGS. 5a and 5b show the dispersion relation for the guided modes of the type 1 and type 2 waveguide. The shading indicates different modes of the structure, and the line type different values of controlling parameters. FIG. 5(a) shows a type 1 waveguide. Positions of the modes as a function of the parameter M. The center-to-center distance between two holes adjacent to the waveguide is defined as $(\sqrt{3}/2)a(1+M/6)$. For M=6, we have single line defect waveguide shown in FIG. 5(b), a type 2 waveguide. Position of the modes as a function of the parameter d, offset along the ΓJ direction.

We can observe that modes 1 and 2 are shifted towards higher frequencies as the width of the waveguide decreases. For parameter M=5 where M is a numerical parameter, mode 1 is shifted closer to the midgap frequency and therefore losses related to the leaks into the planar photonic crystal are reduced. That means that mode 1 can now be used to guide the light in the waveguide. However, a big disadvantage of type 1 waveguide is the broken symmetry of the triangular lattice—it is impossible to create sharp bends with the waveguide sections of the same width as shown in FIG. 4(b), unless we create unwanted line defects close to the bend and in that way reduce the bending efficiency. Therefore, the type 1 waveguide is not a good candidate for controlling the position of the guided modes.

Another, more promising, method of controlling the positions of the guided modes is shown in the FIG. 4(d). This type of waveguide will be called type 2. The waveguide is formed from the planar photonic crystal lattice by moving two regions of planar photonic crystal apart, along the Γ direction, defined as the vector direction to the nearest neighbor in the lattice, by the offset d=I* a shown in FIG. 4(c), and 4(d), where I is a real number. For I=1 we can form the single line defect waveguide, and for 0<I<1 waveguide narrower than a single line defect. Now, it is possible to create sharp 60° bends within the waveguide without introducing unwanted line defects. Dispersion characteristics for guided modes in this structure, as a function of the parameter d, are shown in the FIG. 5(b).

For d=0.5a, mode 1 is pushed to around the midgap frequency, and mode 2 is pushed out of the bandgap, all the way back into the air band. Therefore, we have achieved our goals of designing a waveguide with reduced lateral losses and increased coupling efficiency, since there are no leaky modes at the frequency of interest. However, because of the dislocation of the planar photonic crystal regions, creation of 120° bends as well as an easy integration of type 2 waveguide with photonic crystal cavities, is not straightforward any more. There is one more interesting feature that can be observed in the FIG. 5(b). An extra mode, pulled from the dielectric band up into the bandgap, appears as we reduce the value of the parameter d [labeled acceptor-type mode in the FIG. 5(b)]. This mode has the same symmetry as the mode 1, and therefore the two modes interact strongly (anti-crossing). This mode can be also observed in the case of type 1 waveguide [FIG. 5(a)]. Now, it has to be explained why does the acceptor-type guided mode appear in the donor-type waveguide, since we would expect that—by adding dielectric material guided modes are formed by reducing the frequency of the air-band modes.

Figure 6A:
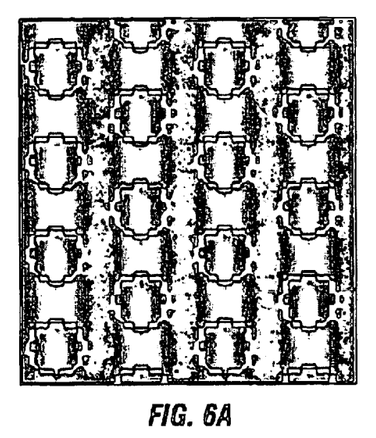
FIGS. 6a and 6b are the electric field distributions for the dielectric and air band respectively.
Figure 6B:
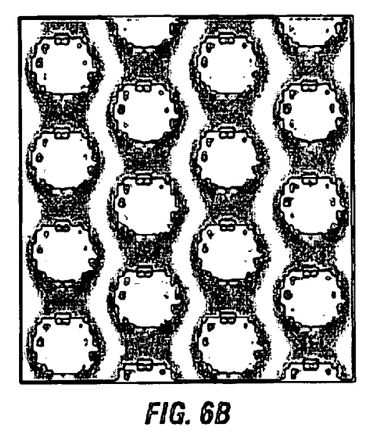
Figure 6C:
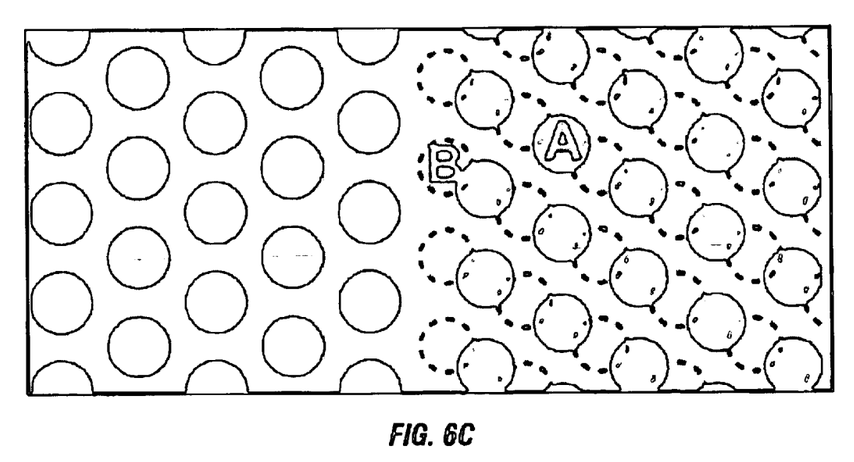
FIG. 6c depicts the positional displacement in the direction, ΓJ.

In order to explain this, we will focus our attention to the FIGS. 6a, b and c. The electric field pattern at X point in the unperturbed planar photonic crystal in the case of dielectric is shown in FIG. 6a and in the case of the air band in FIG. 6b. FIG. 6c shows black holes, a new type of waveguide (for d=0.5a). Black holes at the left hand side and open holes at the right hand side represent positions of the holes in the unperturbed planar photonic crystal. The regions where air replaces dielectric (A) and vice versa (B) as we move holes around (black holes at the right hand side) are also indicated. In the FIG. 6(c) unperturbed planar photonic crystal is represented by the black holes 12a and the open holes 12b. The offsetting of the open holes 12b by amount d=a in ΓJ direction is equivalent to the removal of one row of holes 12a—net result is single line defect waveguide (type 0). In either case, there are regions where dielectric substitutes air, and therefore there are modes from the air band are pulled down into the bandgap to form localized state. However, if the offset is less than a, for example d=0.5a in the case of the FIG. 6(c) (new position of the open holes 12b is represented by the black holes 12c, there will be regions where air will appear instead of the dielectric (A), in addition to regions where dielectric will replace the air (B). Therefore, modes from the dielectric band will be pulled up into the bandgap, due to their increased overlap with air (acceptor-type modes) and modes from the air band will be pulled down into the bandgap due to increased overlap with dielectric (donor-type modes). This explains the appearance of both type of modes in donor-type waveguide. Therefore, we conclude that, in order to form the waveguide, what matters is not the absolute amount of the dielectric material added to the planar photonic crystal, but rather the relative position of the holes in the unperturbed and perturbed planar photonic crystal.

B. Methods Based on Changing the Size of Holes

Figure 7A:
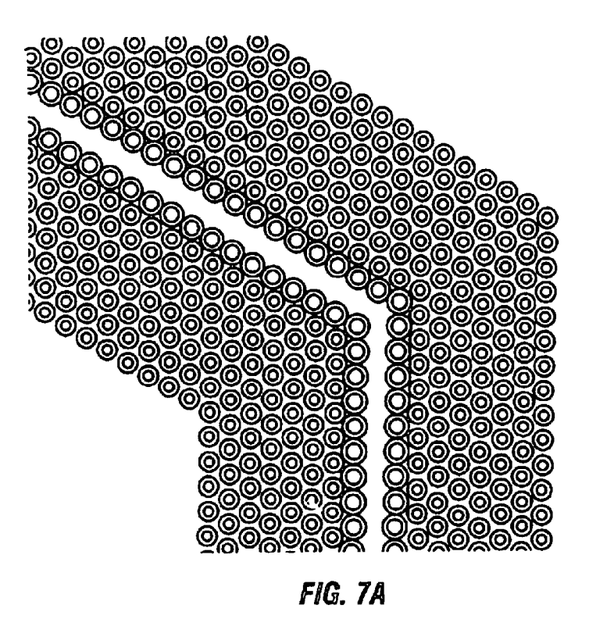
FIG. 7a is a depiction of another embodiment of the geometric perturbation of the hole formations.
Figure 7B:
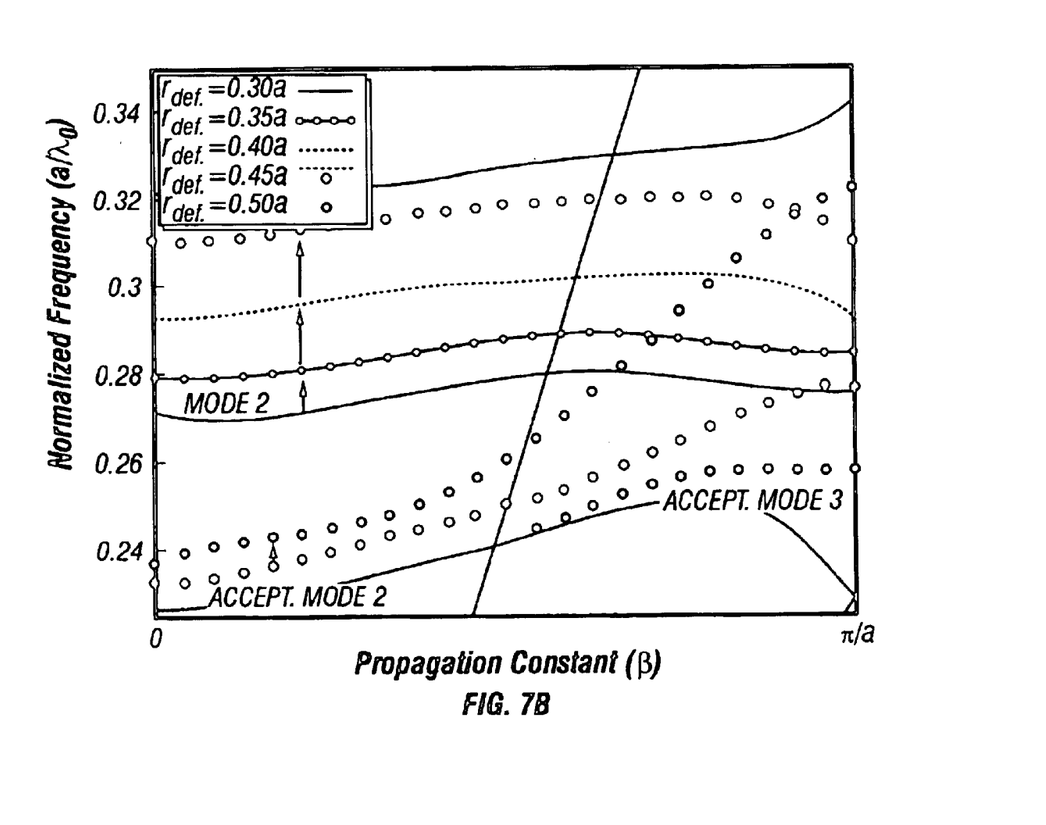
FIGS. 7b and 7c are dispersion diagrams for laterally even and odd modes.
Figure 7C:
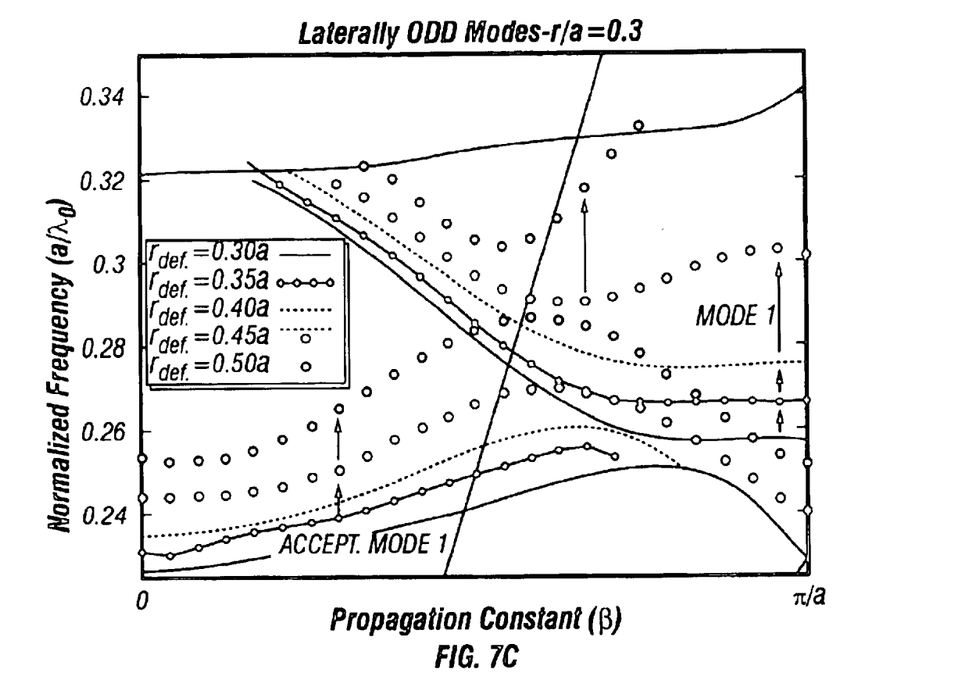

So far we have investigated properties of three different types of waveguides (including the single line defect waveguide). In all cases, waveguides were formed as narrow regions of high dielectric constant material, surrounded by the planar photonic crystal mirrors at both sides. The position of the guided mode within the bandgap was then controlled by moving the holes 12 around. Beside this approach, positions of the guided modes can also be controlled by changing the size of the holes 12 in one or more rows. For example if we increase the radius of the holes 12 adjacent to the single line defect waveguide, we can form a new type of waveguide—type 3 as shown in FIG. 7(a). Here, we present results of the three dimensional FDTD analysis of the structure. In the FIGS. 7(b) and (c) we show the dispersion relation for the TE-like guided modes in this waveguide. FIG. 7(a) is a SEM micrograph of the fabricated type 3 waveguide, formed by increasing the size of the holes adjacent to the single line defect waveguide. FIGS. 7(b) and 7(c) show the dispersion relation for the guided modes in type 3 waveguide. Different line styles indicate different values of controlling parameters. Position of the laterally (a) even, and (b) laterally odd modes are shown as a function of the size of the holes adjacent to the waveguide.

As expected, by increasing the size of the holes 12, the modes of the original waveguide (type 0) are shifted towards higher frequencies. Also, other modes, in both laterally even and odd case, appear—these are acceptor-type modes, pulled up from the dielectric band due to the increased size of the holes 12 adjacent to the waveguide. This is particularly dramatic in the case of the laterally odd modes, where the acceptor-type mode interacts strongly with the donor-type mode 1, and the two anti-cross. Therefore, the feature observed, the bending of the mode 1, is due to its interaction with the acceptor-type mode. For $r_{defect}/a=0.5$, all the donor-type guided modes are pushed back into the air band (there are some leaky donor-type modes, though), and the only modes that remain are the acceptor-type modes. In conclusion, this waveguide has a rather complicated band structure, and many modes are present due to the fact that we have changed the properties of three rows of holes. Therefore, it is probably not a good candidate for efficient controlling of the position of the modes within the bandgap. Also, due to the increased size of holes 12, the structure is less mechanically stable (suspended membrane), and, by analogy with the cavities formed in the planar photonic crystal, we expect reduced efficiency of transmission around sharp corners, due to the increased vertical losses. The advantage of this structure over the type 1 and type 2 waveguides is the fact that no holes 12 are moved, and therefore, the structure has exactly the same symmetry as the original triangular lattice. Because of that, it is possible to create not only the 60° bends, but also the 120∅ ones.

Figure 8A:
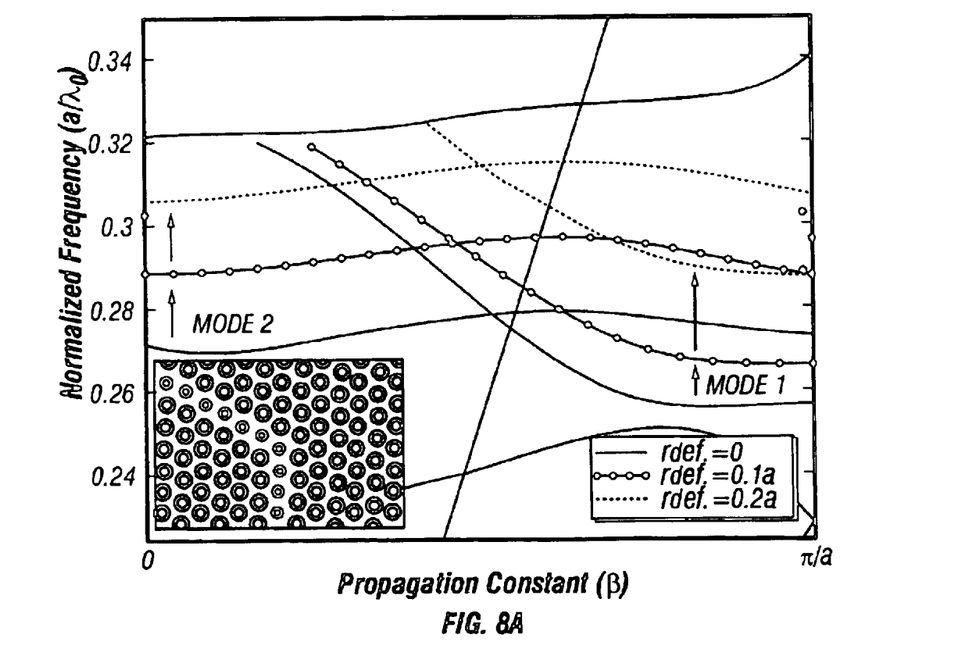
FIGS. 8a, 8b, and 8c are dispersion diagrams resulting from hole diameter reduction, increase and by effective refractive index contrast.

Another, promising, mechanism of controlling the positions of the guided modes within a bandgap is shown in insets in the FIG. 8(a) and (b). The dispersion relation for the guided modes are shown in FIG. 8(a) for type 4 and in FIG. 8(b) for type 5 waveguides, as the function of the radius of the defect holes. The shading indicates different modes of the structure, and the line type different values of the hole radius. SEM micrographs of the fabricated structures are shown in the insets. FIG. 8(c) shows the dispersion diagram for TM-like guided modes supported in type 4 and type 5 waveguides. Guiding is provided by effective refractive index contrast.

The waveguide is formed by reducing (donor-type) or increasing (acceptor-type) the radius of one row of holes 12. In FIG. 8(a) we can observe that by reducing the size of the holes from 0.3a to 0, modes are moving towards lower frequencies. For $r_{defect}=0.2a$ (small perturbation to the rest of planar photonic crystal with r=0.3a mode 1 is centered around the midgap frequency. Therefore, the guiding of light is optimized in a sense that lateral losses due to the coupling to the extended states of the planar photonic crystal are reduced. In addition, coupling from an external light source is optimized since there are no leaky modes around interesting $a/\lambda_0 \approx 0.29$ range. This structure does not support any acceptor-type modes since the waveguide has full symmetry of the triangular lattice and no holes 12 were moved around. The only perturbation is reduction in size of the holes 12, and therefore, only the modes from the air band will be pulled down into the bandgap due to the increased overlap with high dielectric constant material. Finally, integration of any kind of cavities with this type of waveguide is very easy since the full symmetry of the triangular photonic crystal lattice is preserved.

Figure 8B:
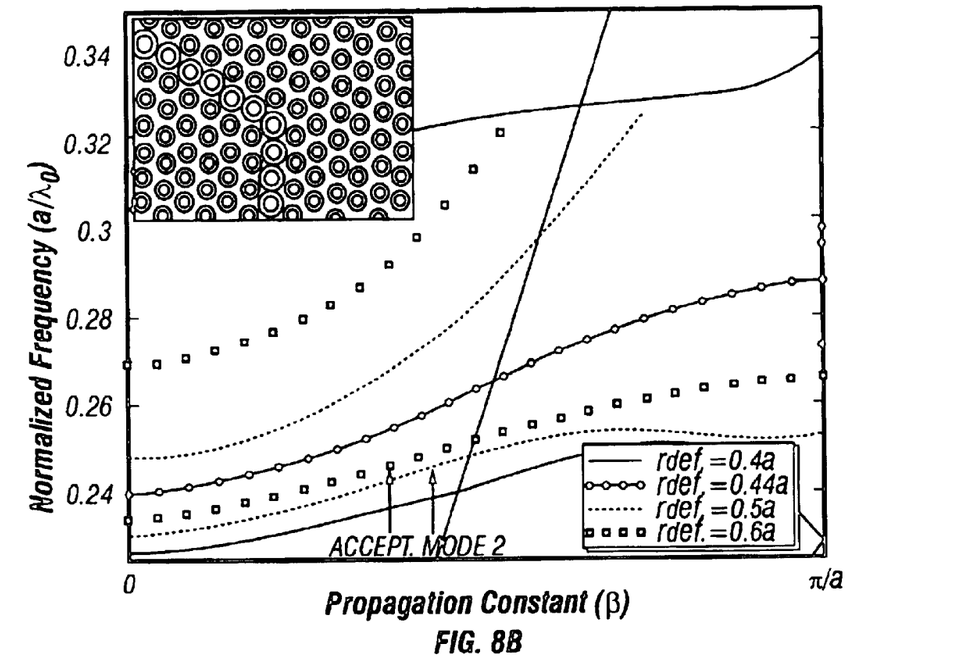
Figure 8C:
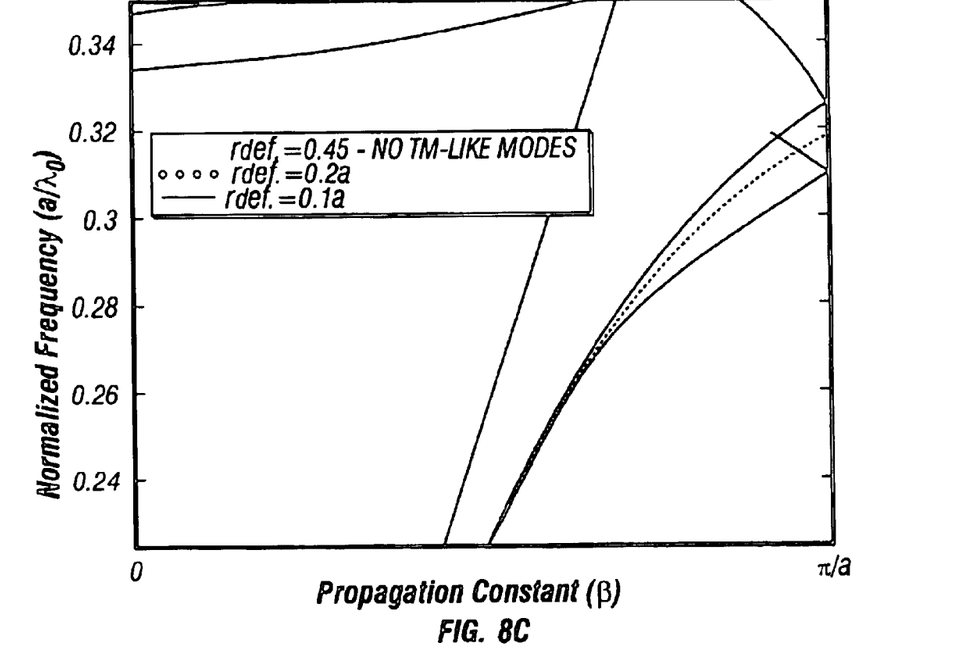

If we increase the size of one row of holes as was done in the case of FIG. 8(b), we form the waveguide that can be used for real single mode operation. By making the holes 12 bigger, the only modes that are localized to the line defect are acceptor-type modes. For $r_{defect}=0.45a$, the first order acceptor-type mode (mode 1) is centered around mid gap frequency, and can be used for guiding of light. This mode is expected to have higher group velocity than any of the modes described above; due to its slope in the ω-β dispersion relation. Also, it spans across wider range than any other mode described so far. These two features are desirable in order to have efficient transport of energy along the waveguide. However, by increasing the size of the holes 12, the efficiency of turning sharp bends might decrease due to the increased vertical losses since the light is less confined to the slab (bigger holes 12). This waveguide is very interesting structure for investigation fundamental properties of the photonic crystal guiding mechanism. The reason is the fact that guided modes in this structure are truly PBG effect guided modes. Guiding by effective refractive index contrast is not possible in this structure, since the "core" of the waveguide (line with bigger holes 12) actually has smaller effective refractive index than the surrounding planar photonic crystal as illustrated by FIG. 8(c). Therefore, TM-like modes will not be guided in this structure at all. Therefore, in experiment, any light that is guided, and detected at the output of the waveguide has to be guided due to the PBG effect.

Conclusions

In conclusion, we have presented and analyzed in three dimensions, using the FDTD, several mechanisms of controlling the position of the guided modes within the planar photonic crystal based waveguides. Ability to engineer the position of the guided mode is very important in order to achieve efficient guiding (reduced vertical and lateral losses), coupling of light into the structure and matching the frequencies of eigen-modes of coupled photonic crystal based devices (i. e. cavities coupled to waveguides). The appearance of the acceptor-type modes in donor-type waveguides is observed and explained. Importance of the relative position of the holes 12 versus the absolute amount of added high dielectric constant material is emphasized. Finally, structures were fabricated in Si and are about to be experimentally characterized in our laboratory.

Many alterations and modifications may be made by those having ordinary skill in the art without departing from the spirit and scope of the invention.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A photonic crystal waveguide for coupling with optic devices having positions of guided modes defined within a bandgap comprising:
    a planar photonic crystal slab in which an array of holes with periodic spacing is defined; and
    a waveguide defined by a line defect defined the array of holes in said slab, said line defect being created by a geometric perturbation of at least a first set of holes in the array with respect to a second set of holes in the array by a displacement of the first and second set of holes with respect to each other by an amount unequal to the periodic spacing of holes in the array to create at least one guided mode of light propagation in said waveguide so that the positions of the guided modes are controlled within the bandgap
    where said predetermined direction is the ΓX direction in said slab, said waveguide being defined as a type 1 waveguide or where said predetermined direction is the ΓJ direction in said slab, said waveguide being defined as a type 2 waveguide.

2. The waveguide of claim 1 where said positional displacement, d, is a fraction, I, of lattice spacing, a, of said array, d=I*a, where 0<I<1.

3. The waveguide of claim 2 where d=0.5a.

4. The waveguide of claim 2 where said waveguide has a bandgap and where d is reduced until both acceptor-type modes and donor-type modes are positioned in the bandgap of said waveguide.

5. The waveguide of claim 1 where said slab has a bandgap, an air band and a dielectric band for propagation of modes and where said geometric perturbation is created by displacement of holes into positions within said array of holes where dielectric is normally present to pull modes from the dielectric band into the bandgap.

6. The waveguide of claim 1 where said slab has a bandgap, an air band and a dielectric band for propagation of modes and where said geometric perturbation is created by displacement of dielectric into positions within said array of holes where air is normally present to pull modes from the air band into the bandgap.

7. The waveguide of claim 1 where said geometric perturbation is created by increasing or decreasing the diameter of a first set of holes in said array of holes relative to a second set of holes comprising a remainder of holes of said array, said first set of holes being adjacent at least in part to said line defect, said waveguide defined as a type-3 waveguide.

8. The waveguide of claim 7 where slab has a bandgap and an air band and where second set of holes has a radius, r=0.3a and said first set of holes has a radius, $r_{defect}$=0.2a and said array of holes has a triangular lattice so that only air band modes are pulled down in the bandgap and no acceptor-type modes are present.

9. The waveguide of claim 7 where slab has a bandgap and an air band and where second set of holes has a radius, r=0.3a and said first set of holes has a radius, $r_{defect}$=0.45a and said array of holes has a triangular lattice so that only acceptor-type modes are present.

10. The waveguide of claim 1 where said light is guided in said waveguide due to photonic bandgap (PBG) effect.

11. A method for controlling positions of guided modes within a photonic crystal waveguide within a bandgap comprising:
    defining an array of holes in a planar photonic crystal slab with periodic spacing; and
    controlling the positions of the guided modes within the bandgap by creating a line defect in said slab to define said waveguide, said line defect being created by a geometric perturbation of at least a first set of holes with respect to a second set of holes in which the line defect is characterized by a displacement of the first and second set of holes with respect to each other by an amount unequal to the periodic spacing of holes in the array
    where controlling the positions of the guided modes within the bandgap comprises forming the first set of holes creates holes displaced in the ΓX direction in the slab to form a type 1 waveguide, or forming the first set of holes creates holes displaced in the ΓX direction in the slab to create a type 2 waveguide.

12. The waveguide of claim 11 where forming said first set of holes displaces said holes by a displacement, d, is a fraction, I, of lattice spacing, a, of said array, d=I*a, where 0<I<1.

13. The method of claim 12 where forming said first set of holes displaces said holes by a displacement, d=0.5.

14. The method of claim 12 where said waveguide has a bandgap and where forming said first set of holes displaces said holes by a d which is reduced until both acceptor-type modes and donor-type modes are positioned in the bandgap of said waveguide.

15. The method of claim 11 where said slab has a bandgap, an air band and a dielectric band for propagation of modes and where creating said line defect comprises forming said first set of holes displaced by displacement of holes into positions within said array of holes where dielectric is normally present to pull modes from the dielectric band into the bandgap.

16. The method of claim 11 where said slab has a bandgap, an air band and a dielectric band for propagation of modes and where creating said line defect comprises forming said first set of holes displaced by displacement of holes into positions within said array of holes where air is normally present to pull modes from the air band into the bandgap.

17. The method of claim 11 where creating said line defect comprises increasing or decreasing the diameter of a first set of holes in said array of holes relative to a second set of holes comprising a remainder of holes of said array, said first set of holes being adjacent at least in part to said line defect, said waveguide defined as a type-3 waveguide.

18. The method of claim 17 where slab has a bandgap and an air band and where creating said line defect comprises decreasing the diameter of a first set of holes to a radius, $r_{defect}=0.2a$ and said second set of holes has a radius, $r=0.3a$ and said first set of holes has said array of holes has a triangular lattice so that only air band modes are pulled down in the bandgap and no acceptor-type modes are present.

19. The method of claim 17 where slab has a bandgap and an air band and where creating said line defect comprises increasing the diameter of a first set of holes to a radius $r_{defect}=0.45a$, where second set of holes has a radius, $r=0.3a$, and said array of holes has a triangular lattice so that only acceptor-type modes are present.

20. The method of claim 11 where creating said line defect comprises guiding light in said waveguide solely due to photonic bandgap (PBG) effect.

* * * * *